UNITED STATES PATENT OFFICE.

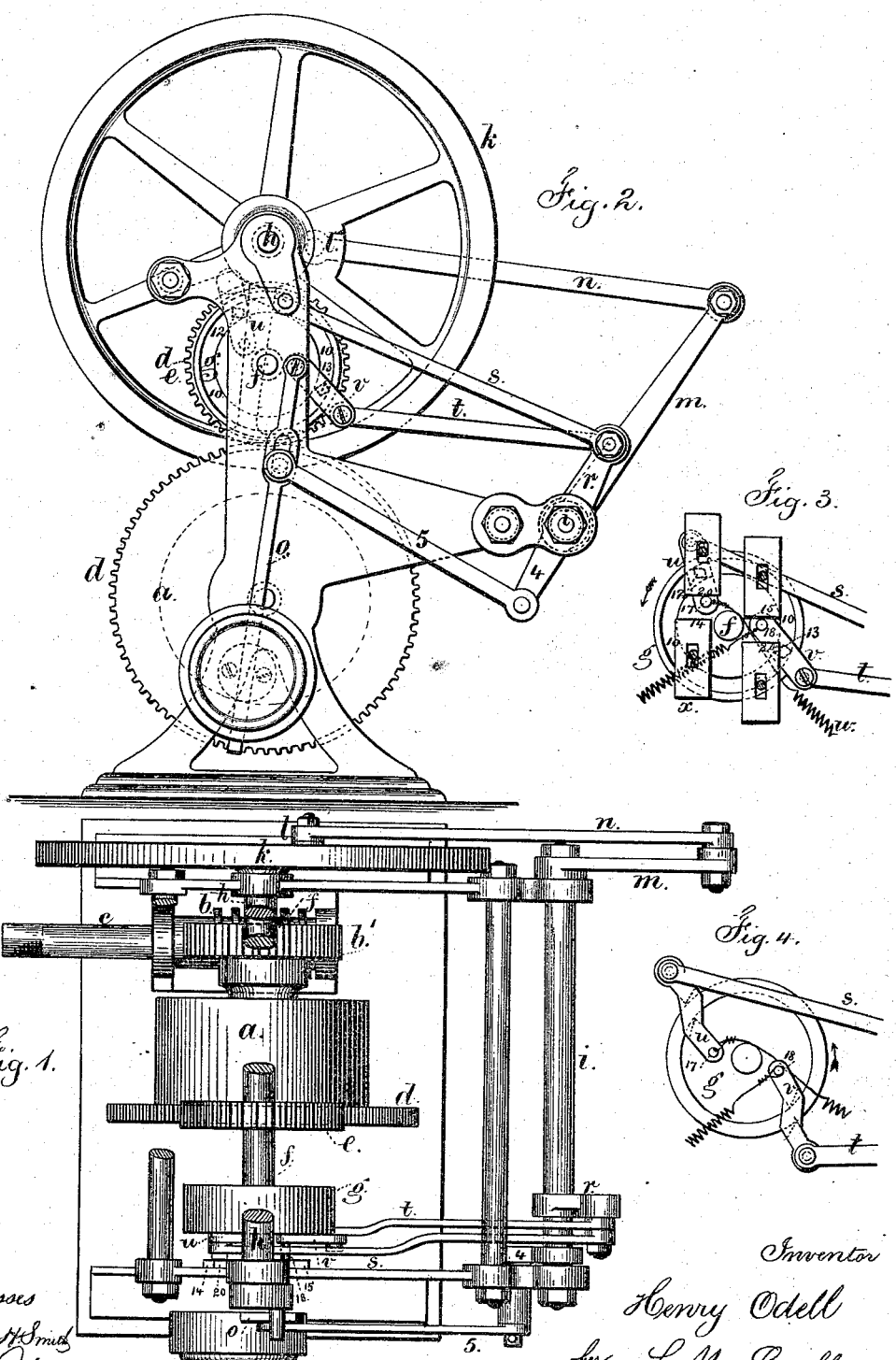

HENRY ODELL, OF PEEKSKILL, NEW YORK.

IMPROVEMENT IN MOTORS FOR CHURNS, &c.

Specification forming part of Letters Patent No. 160,461, dated March 2, 1875; application filed November 11, 1874.

*To all whom it may concern:*

Be it known that I, HENRY ODELL, of Peekskill, in the county of Westchester and State of New York, have invented an Improvement in Motors for Churns, &c., of which the following is a specification:

Motors have been made with a ratchet-wheel propelled by a spring or weight, and acting against pawls that are hinged to the arms of a rock-shaft, to give a rotary movement to a fly-wheel by a link to such rock-shaft. It is necessary to position these pawls with accuracy, in order to cause them to operate correctly with the rock-shaft and ratchet-wheel.

My present invention relates to means for transmitting the power from a spring or weight to a fly-wheel by combining friction-clamps with a revolving wheel and connections from the same to the fly-wheel, the parts being constructed in such a manner that the wheel will move the friction-clamps, and they will move the connections to the fly-wheel. One clamp will be liberated by coming into contact with a fixed stop as the other clamp is taken by the wheel, each clamp being brought back to the starting-point by the action of a spring. By this improvement the ratchet-teeth and pawls are dispensed with.

In the drawing, Figure 1 is a plan of the machine. Fig. 2 is an elevation endwise of the shaft; and Fig. 3 is a detached view, illustrating the friction-clamps. Fig. 4 represents a modification in the shape of the clamp.

The spring within the barrel $a$ is wound by the worm-pinion $b$ and shaft $c$ acting upon a gear-wheel, $b'$, upon the shaft of that barrel, and the power is transmitted by the wheels $d$ and $e$ to the shaft $f$ and friction-wheel $g$. The shaft $h$, fly-wheel $k$, and crank $l$ are to be rotated. For this purpose the rock-shaft $i$, arm $m$, and link $n$ are represented; and the rock-shaft $i$ is connected, by the arm 4 and link 5, with the pendulum $o$, to aid in rendering the movement uniform. The link 5 may be adjusted at its connection to the pendulum-rod, or the pendulum may be lengthened or shortened. The arm $r$ of the rock-shaft $i$ has connected with it links $s$ and $t$ to the friction-clamps, that operate alternately with the wheel $g$. Each friction-clamp is made with a lever and means for grasping the wheel.

In Fig. 3 I have shown a polygonal pin in the groove 10 of the wheel $g$; or this wheel $g$ may have grooves in each face, and the levers be two-part or forked, and the clamping-pins be duplicated and stand facing each other; or the lever may be notched, to grasp the rim of the wheel in one direction, and to slide upon it in the other direction, as shown in Fig. 4. The link $s$ is connected to the lever $n$, which is provided with the polygonal pin 12, retractile spring $w$, and the link $t$, and is hinged to the lever $v$, that has a polygonal pin, 13, and retractile spring $x$. There are stops 14 and 15 fixed on the frame of the machine, but adjustable, and these trip the friction-levers.

The springs $x$ $w$ tend to draw each lever $u$ or $v$, so as to make the friction-clamps operative by turning the pin 12 or 13 with its longest diameter across the groove 10 in the wheel $g$; hence such pin will then act by friction to move the lever $u$ or $v$, link $s$ or $t$, and rock-shaft $i$ as the wheel $g$ is turned by the spring or weight; but when the movement of $g$ brings the pin 17 or 18 of its lever $u$ or $v$ into contact with the stop 14 or 15, the lever $u$ or $v$ is turned, so as to release the hold of the pin in the groove, and hence the friction-clamp of that lever is free to be drawn by its spring $x$ or $w$ back to the point of beginning, the amount of movement being determined by the stops 20; and as the rock-shaft swings, and the link of the released clamp changes position, (by the power applied through the other clamp,) the pin of the inactive clamp is turned in its groove, and clamps therein at the moment the crank of the fly-wheel $k$ passes its center, and the clamp that had been previously operative is liberated, and the other one, coming into action at the opposite side of the friction-wheel, gives a movement in the opposite direction to the rock-shaft $i$, and thus the movement is kept up, one clamp catching the wheel $g$ just as the other one is liberated.

The motions are the same when the friction-clamp catches upon the edge of the wheel, as in Fig. 4. The stops 14, 15, and 20 are omitted from this figure to show other parts more clearly.

The rotary motion obtained in this manner may be applied to any desired purpose, such as churning or other light work.

I claim as my invention—

The double friction-clamps $u$ and $v$, friction-wheel $g$, constructed and operating substantially as set forth, in combination with a fly-wheel and connections and a motor for the friction-wheel, as specified.

Signed by me this 9th day of November, A. D. 1874.

HENRY ODELL.

Witnesses:
GEO. T. PINCKNEY,
CHAS. H. SMITH.